United States Patent [19]

Finsness et al.

[11] 4,288,845
[45] Sep. 8, 1981

[54] AERIAL REFUELING RECEPTACLE FLOODLIGHTS-SPOILER AND FUSELAGE, NOSE MOUNTED

[75] Inventors: Wilma L. Finsness, Bellevue; Richard I. McMonagle, Bothell; Edward M. Sedenquist, Seattle, all of Wash.

[73] Assignee: The United States of America as represented by the Secretary of the Air Force, Washington, D.C.

[21] Appl. No.: 64,932

[22] Filed: Aug. 8, 1979

[51] Int. Cl.³ .................. B64D 47/02; B64D 37/00
[52] U.S. Cl. .................. 362/63; 244/135 A; 362/62; 362/233; 362/250; 362/390
[58] Field of Search .............. 362/62, 63, 233, 250, 362/390; 244/135 A

[56] References Cited

U.S. PATENT DOCUMENTS

| | | | |
|---|---|---|---|
| 2,663,523 | 12/1953 | Leisy | 244/135 A |
| 2,849,200 | 8/1959 | Person | 244/135 A |
| 3,108,769 | 10/1963 | Hieber | 244/135 A |
| 3,285,544 | 11/1966 | Chope et al. | 244/135 A |
| 3,917,196 | 11/1975 | Pond et al. | 244/135 A |
| 4,095,761 | 6/1978 | Anderson et al. | 244/135 A |

Primary Examiner—Edward A. Miller
Assistant Examiner—Irwin Gluck
Attorney, Agent, or Firm—Donald J. Singer; Arsen Tashjian

[57] ABSTRACT

A floodlight illumination system, in structural combination with a fuel-receiving aircraft having an aerial refueling receptacle, that permits efficient and effective in-flight night refueling of the aircraft. The illumination system comprises: a selectively lightable, retractable aerodynamically shaped spoiler mounted on the nose of the aircraft which illuminates the top surface of the refueling receptacle, and, two similar (i.e., symmetrically shaped and dimensioned), selectively lightable fairings mounted on the port and starboard sides of the hose of the aircraft, parallel to airflow lines, with one fairing illuminating the port side surface of the refueling receptacle, and with the other fairing illuminating the starboard side surface of the refueling receptacle. The result is adequate and glare-free lighting of the refueling receptacle of the receiving aircraft, which, in turn, allows the operator of the refueling boom of the refueling aircraft to refuel the receiving aircraft without the loss of depth of perception, and without the glare, which ordinarily occur when a receiving aircraft is conventionally illuminated for in-flight night refueling.

6 Claims, 8 Drawing Figures

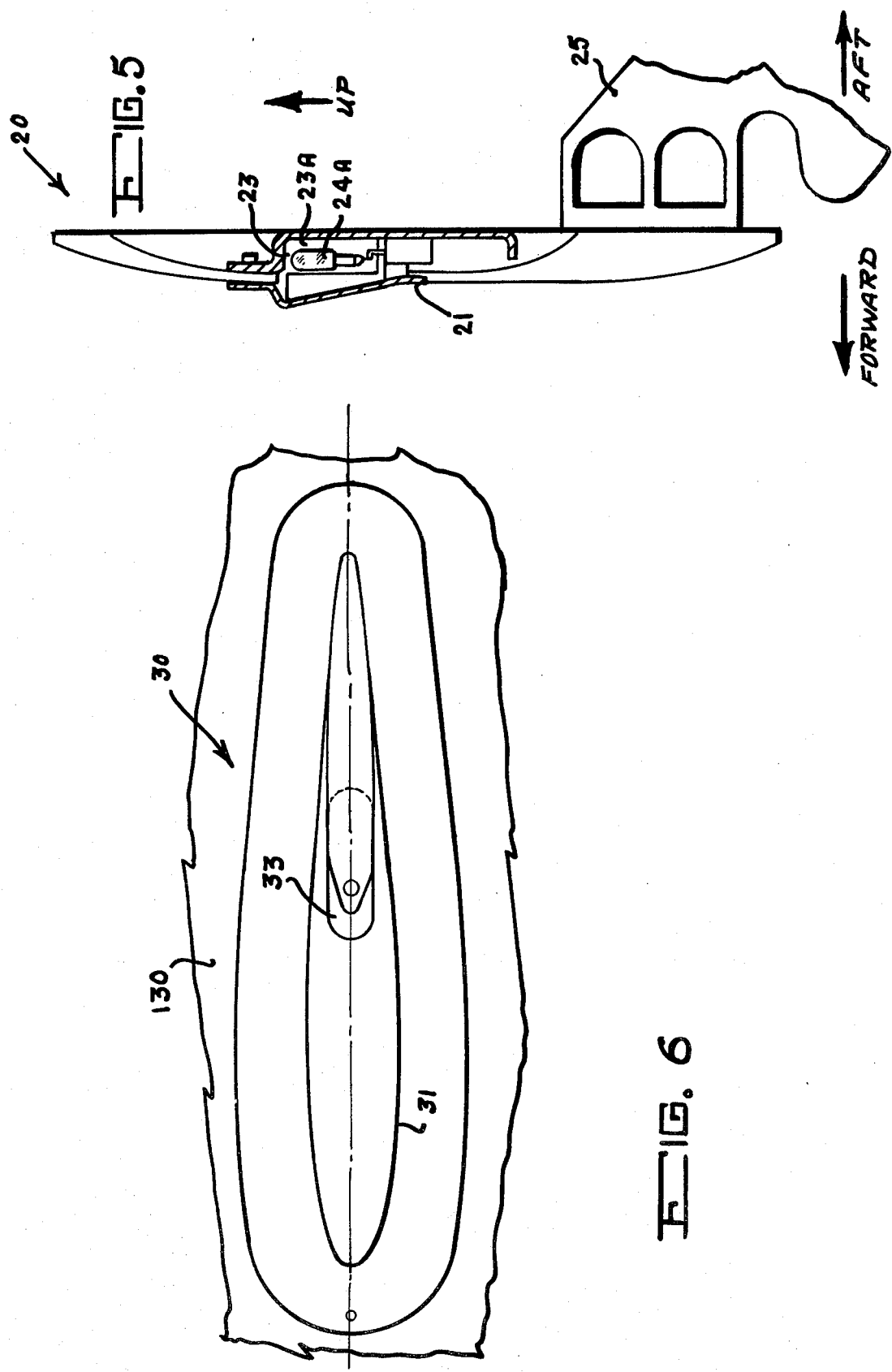

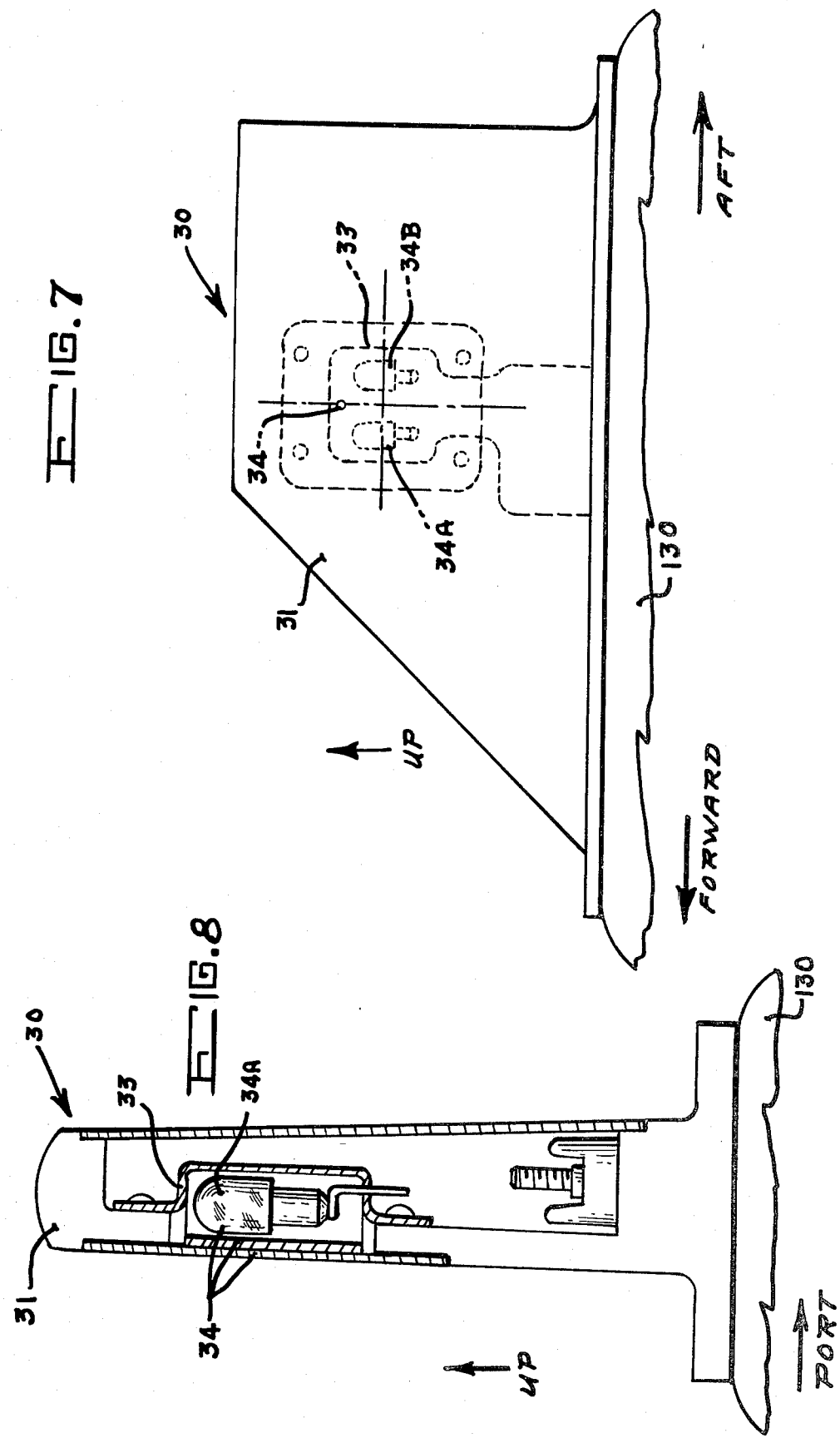

AERIAL REFUELING RECEPTACLE FLOODLIGHTS-SPOILER AND FUSELAGE, NOSE MOUNTED

STATEMENT OF GOVERNMENT INTEREST

The invention described herein may be manufactured and used by or for the Government for governmental purposes without the payment of any royalty thereon.

BACKGROUND OF THE INVENTION

This invention relates to aircraft refueling and, more particularly, to night aerial refueling of aircraft.

It is fair and accurate to say that, with regard to night aerial refueling of aircraft, there presently exist in the art two problems which materially hinder such refueling. Firstly, if the aerial refueling receptacle fairing and surrounding fuselage of the receiving aircraft are not adequately illuminated, the depth perception of the operator of the refueling boom of the refueling aircraft is inadequate, and adversely effects the efficient refueling of the receiving aircraft. Secondly, if the aerial refueling receptacle fairing and surrounding fuselage are too brightly illuminated, objectional glare sources are created, likewise adversely affecting the efficient refueling of the receiving aircraft. Therefore, what is needed in the art and is not presently available, is a means of providing adequate lighting of the aerial refueling receptacle fairing and surrounding fuselage of the fuel receiving aircraft, whereby the loss of depth of field and glare are eliminated or, at least, are reduced to an immaterial minimum.

We have invented such a means; and, thereby, we have significantly advanced the state-of-the-art.

SUMMARY OF THE INVENTION

Our invention comprises a unique aerial refueling receptacle floodlight system which, in structural combination with a fuel receiving aircraft upon which the system is mounted, results in providing adequate illumination of the aircraft's refueling receptacle; and, therefore, also results in the efficient and effective refueling of the in-flight receiving aircraft during the night.

Accordingly, the principal object of this invention is to teach the structure of a preferred embodiment of this unique floodlight system-refueling aircraft combination.

This principal object, as well as other related objects, of this invention will become readily apparent after a consideration of the description of the invention, together with reference to the Figures of the drawings.

DESCRIPTION OF THE DRAWINGS

FIG. 5 is a side elevation view of the constituent spoiler floodlight assembly shown in FIGS. 3 and 4;

FIG. 6 is a top plan view of one representative constituent nose firing floodlight assembly, of which there are two, of the preferred embodiment of the invention shown in FIGS. 1 and 2;

FIG. 7 is a side elevation view of the representative constituent nose fairing floodlight assembly shown in FIG. 6; and FIG. 8 is a front view in simplified form, both schematic and pictorial, and in cross section of the representative constituent nose fairing floodlight assembly shown in FIGS. 6 and 7.

DESCRIPTION OF THE PREFERRED EMBODIMENT

Figure 1:
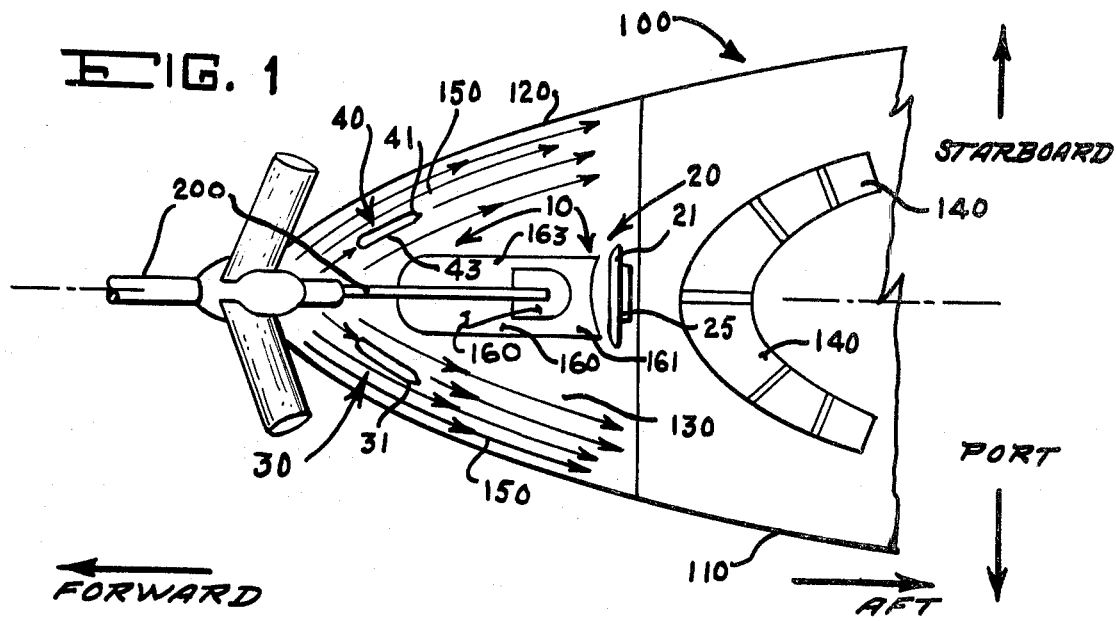
FIG. 1 is a top plan view, in simplified form, both pictorial and schematic, and partially fragmented of the preferred embodiment as mounted on the aircraft with which it is to be used.
Figure 2:
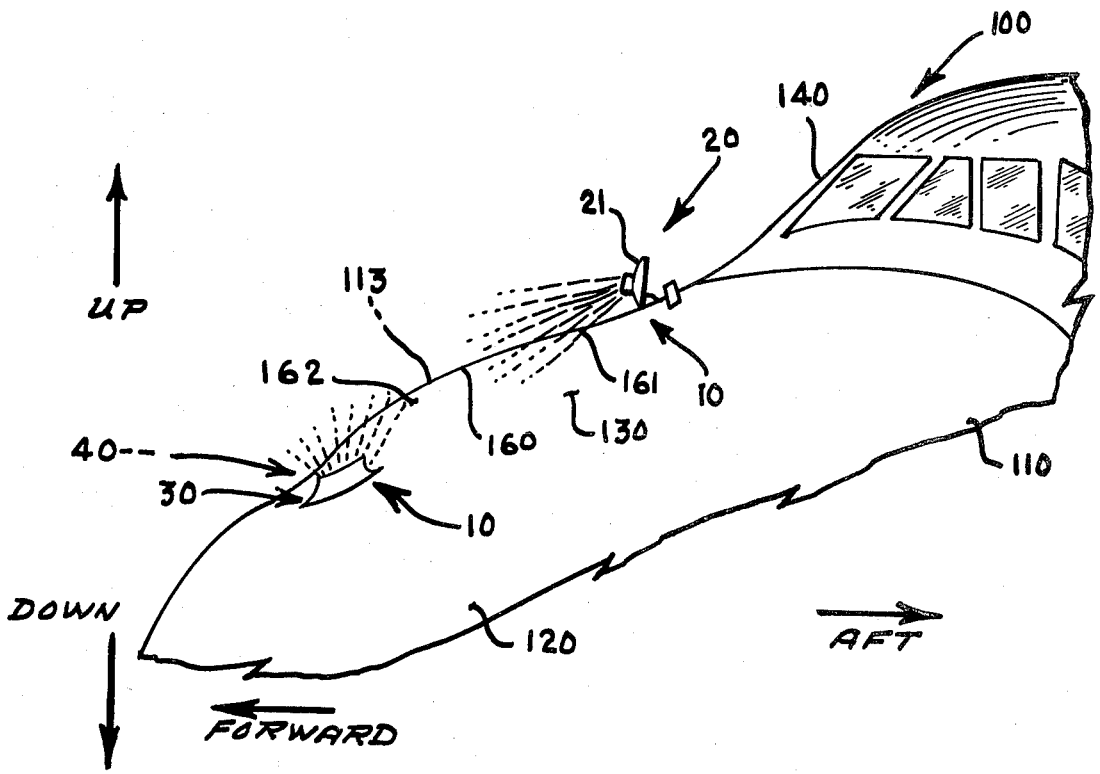
FIG. 2 is a side elevation view, also in simplified form and partially fragmented, of the preferred embodiment and aircraft shown in FIG. 1.

With reference to FIGS. 1 and 2, it is to be noted and remembered that our invention aerial refueling receptacle floodlight illumination system is for use at night in combination with an aircraft 100 (which, by way of illustration and not because of any limitation, is a wide-bodied Boeing Aircraft Company Model 747, and more specifically Model 747-E4B) having a longitudinal axis (i.e., roll axis) A-B, a fuselage 110 with a nose section 120 having an upper surface 130, a cockpit windshield 140 aft of the upper surface 130 of the nose section 120 and in alignment with the longitudinal axis A—B, and airflow lines, generally designated 150, along the upper surface 130, and an aerial refueling receptacle 160 located on the upper surface 130 of the nose section 120 and in alignment with the longitudinal axis A—B, and with the receptacle 160 having top surface 161 and front (and side) surfaces 162 and 163.

Also shown in FIG. 1 is a refueling boom 200, from a refueling aircraft (not shown), that has been inserted into, and secured in, the inlet of the refueling receptable 160 of the fuel-receiving aircraft 100, with fuel (not shown) being passed from the refueling aircraft (not shown) through the refueling boom 200 to the receiving aircraft 100.

To better orient the reader, FIG. 1 has been legended with the designations "Forward", "Aft", "Starboard", and "Port" (together with directional arrows), and FIG. 2 has been lengended with the designations "Forward", "Aft", "Up" and "Down" (together with directional arrows).

Now, with reference to FIGS. 1-8, inclusive, the preferred embodiment 10 of the aerial refueling receptacle floodlight illuminating system constituent of the illuminating system-aircraft combination is shown therein in various and diverse views. Also shown in FIGS. 2-6, inclusive (as was shown in FIGS. 1 and 2), are directional designations with arrows to better orient the reader. In its most basic and generic form, the illuminating system 10 comprises: (a) a spoiler floodlight assembly 20 that is disposed on and in the upper surface 130 of the nose section 120 of the aircraft constituent 100 of the combination; (b) a first nose fairing floodlight assembly 30 that is disposed on and in the port upper surface 130 of the nose section 120; and, (c) a second nose fairway floodlight assembly 40 that is disposed on and in the starboard the upper surface 130 of the nose section 120.

More specifically, and with reference to FIGS. 1-5, inclusive, the spoiler floodlight assembly 20 includes: (a) an aerodynamically configurated spoiler 21 that is retractably mounted, in a substantially vertically upward position, on the upper surface 130 of the nose section 120, aft of the refueling receptacle 160 and foreward of the cockpit windshield 140, and with the spoiler 21 disposed transverse to the longitudinal axia A—B;

(b) a first floodlight means 23 for selectively illuminating the refueling receptacle 160, with this means 23 disposed partially within the spoiler assembly 20 itself, which is integrated; and, (c) means, generally designated 25, for retracting the spoiler 21 into a stowed and longitudinal-like position which is essentially flush with the upper surface 130 of the nose section 120. One such retracting means 25 is described in U.S. Pat. No. 4,095,761 (issued to Anderson et al, on June 20, 1978) in column 3, lines 35-52, inclusive; and, is shown in that U.S. Patent in FIG. 12.

With reference to FIG. 2 and FIGS. 6-8, inclusive, therein is shown, in diverse views, a representative one constituent nose fairing floodlight assembly 30, of which there are two similar ones (i.e., 30 and 40, FIG. 1), of the inventive illuminating system 10. It is here to be noted that in the interest of reducing the number of Figures in the drawing (consistent with making full disclosure), only the one representative nose fairing floodlight assembly 30 will be shown in full. It being understood that the first nose fairing assembly 30 and the second nose fairway assembly 40 are structurally symmetrical (i.e., are mirror-images of each other).

The first nose fairing floodlight assembly 30, FIGS. 1, 2 and 6-8, inclusive, is disposed on and in the upper surface 13 of the nose section 120, and this assembly 30 includes: (a) a first blade-like configured fairing 31 mounted substantially vertically upward on the upper surface 130 of the nose section 120, forward of the cockpit windshield 140, FIGS. 1 and 2, adjacent to and port of the refueling receptical 160, and parallel to the airflow lines 150 along the upper surface 130 of the nose section 120; and, (b) a second floodlight means 33 for selectively illuminating the (port side surface of the) refueling receptacle 160, with this means 33 disposed partially within the first nose fairing 31. Likewise, the second nose fairing floodlight assembly 40, FIG. 1, is disposed on and in the upper surface 130 of the nose section 120, and this assembly 40, includes: (a) a second blade-like configured fairing 41, FIG. 1, mounted substantially vertically upward on the upper surface 130 of the nose section 120, forward of the cockpit windshield 140, FIG. 1, adjacent to and starboard of the refueling receptical 140 FIG. 1, and parallel to the airflow lines 150, FIG. 1, along the upper surface 130 of the nose section; and, (b) a third floodlight means 43 for selectively illuminating the (starboard side surface of the) refueling receptical 160, within this means 43 disposed partially within the second nose fairing 41.

Figure 3:
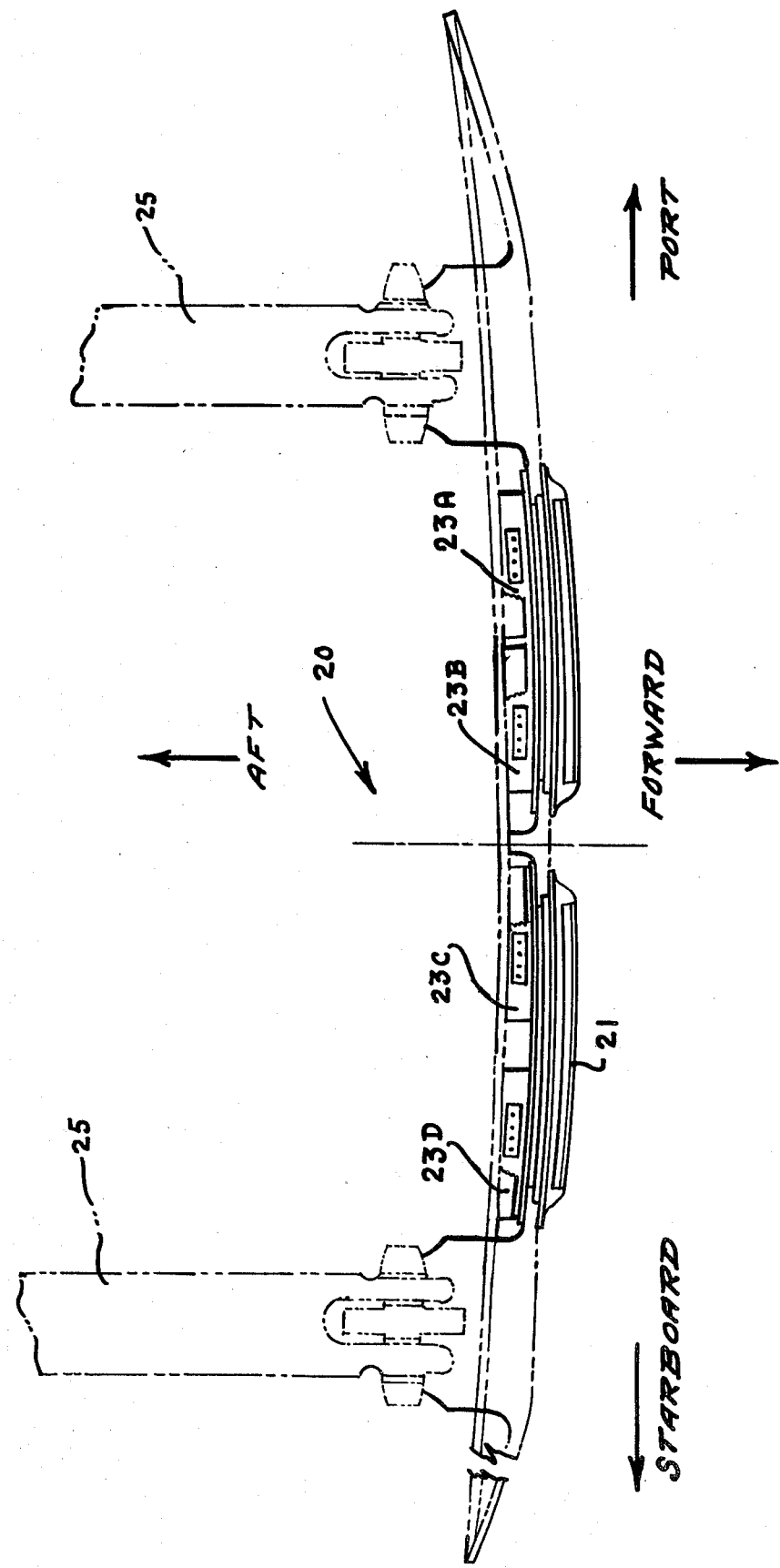
FIG. 3 is a top plan view of the constituent spoiler floodlight assembly of the preferred embodiment of the invention shown in FIGS. 1 and 2.
Figure 4:
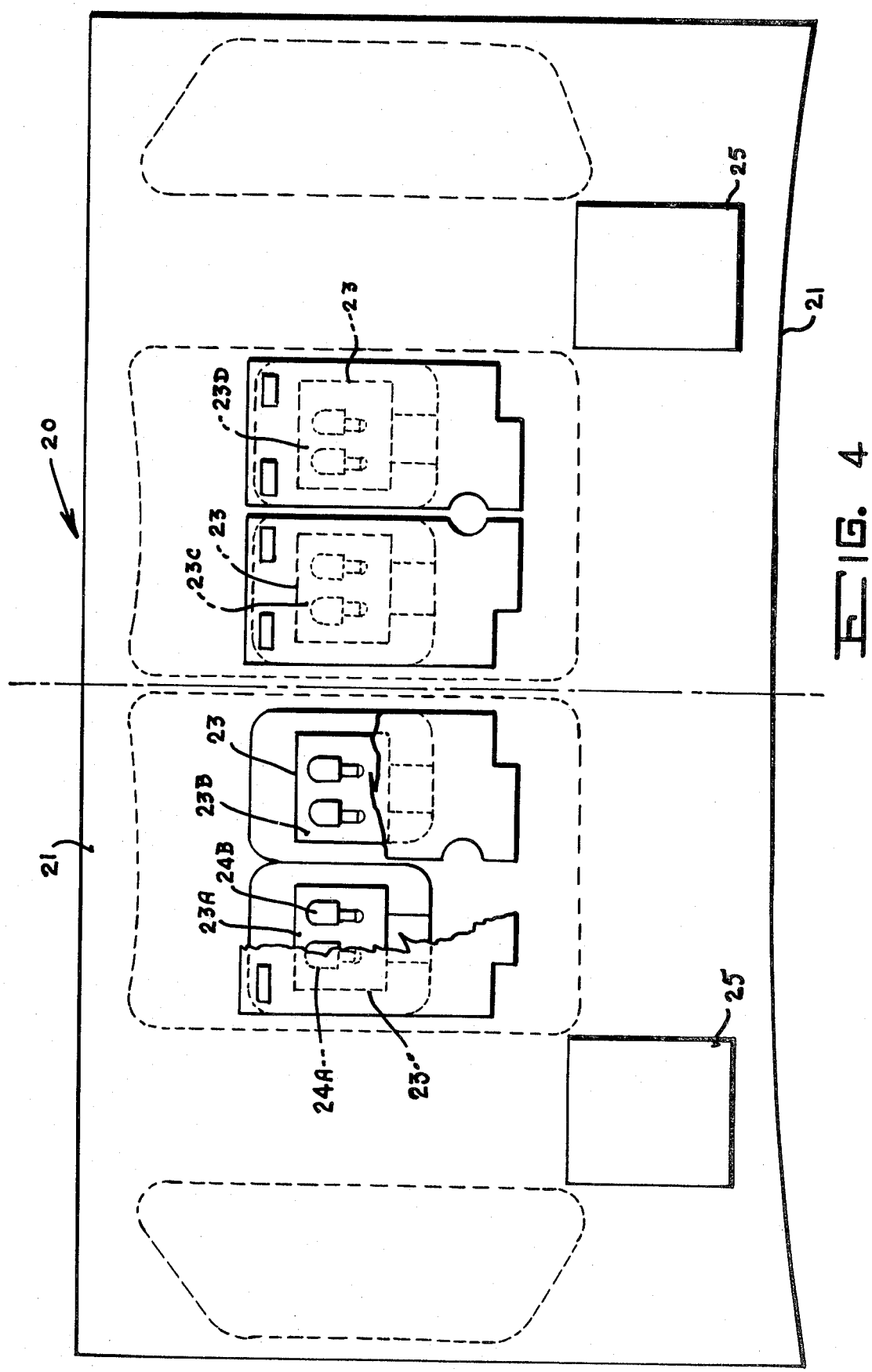
FIG. 4 is a rear view of the constituent spoiler floodlight assembly shown in FIG. 3.

Now, with reference to FIGS. 3 and 4, it is to be noted that, as a matter of preference and not of limitation, the first floodlight means 23 of the spoiler floodlight assembly 20 include a plurality (preferably two) of floodlight illuminating sources, such as 24 A and 24 B for subassembly 23 A. Likewise, and with reference to FIGS. 7 and 8, the floodlight means 33 of the first nose fairing floodlight assembly 30, and the floodlight means 43 of the second nose fairing floodlight assembly 40, includes one floodlight illuminating subassembly (such as 34 for assembly 30) which, in turn, includes a plurality (preferably two) of floodlight illuminating sources (such as 34 A and 34 B for subassembly 34).

MANNER OF OPERATION OF THE PREFERRED EMBODIMENT

The manner of operation of the preferred embodiment 10 of the constituent floodlight illumination system of this inventive combination can be easily ascertained by any person or ordinary skill in the art from the foregoing description, coupled with reference to the Figures of the drawings.

For others, it is sufficient to say that when the receiving aircraft 100, in combination with the floodlight illumination system 10, is to be refueled at night by aircraft having a refueling boom 200, such as is shown in FIG. 1, the floodlight illumination system 10 is "turned on", and the first, second, and third floodlight means 23, 33 and 43 adequately illuminate the top surface 161 and the side surfaces 162 and 163 of the refueling receptacle 100 (and, of course, the refueling receptacle 160 itself) of the aircraft 100 to be refueled, without glare. As a result of this adequate and glare-free illumination, the depth perception and seeing ability of the boom operator is not, as it would otewise be, impaired. Therefore, the night refueling can be more effectively and efficiently accomplished than it can be presently.

CONCLUSION

It is abundantly clear from all of the foregoing, and from the Figures of the drawings, that the stated principal object, as well as other related objects, of the inventive combination have been achieved.

It is to be noted that, although there have been described and shown the fundamental and unique feature of our invention as applied to a preferred embodiment, various other embodiments, variations, adaptations, substitutions, addition, omissions, and the like may occur to, and can be made by those or ordinary skill in the art, without departing from the spirit of the invention.

What is claimed is:

1. An aerial refueling receptacle floodlight illuminating system for use at night in combination with an aricraft having a longitudinal axis, a fuselage with a nose section having an upper surface and airflow lines along said upper surface, a cockpit windshield aft of said upper surface of said nose section and in alignment with said longitudinal axis, and an aerial refueling receptacle located on said upper surface of said nose section and in alignment with said longitudinal axis, with said receptacle having top and front surfaces, comprising:
   a. a spoiler floodlight assembly disposed on and in said upper surface of said nose section wherein said assembly includes:
      (1) an aerodynamically configured spoiler retractably mounted substantially vertically upward on said upper surface of said nose section, aft of said refueling receptacle and forward of said cockpit windshield, and disposed transverse to said longitudinal axis;
      (2) a first floodlight means for selectively illuminating said refueling receptacle, with said means disposed partially within said spoiler;
      (3) and, means for retracting said spoiler into a stowed and longitudinal-like position which is essentially flush with said upper surface of said nose section;
   b. a first nose fairing floodlight assembly disposed on and in said upper surface of said nose section, wherein said assembly includes:
      (1) a first blade-like configured fairing mounted substantially vertically upward on said upper surface of said nose section, forward of said cockpit windshield, adjacent to and port of said refueling receptacle, and parallel to such airflow lines along said upper surface of said nose section;
  (2) and, a second floodlight means for selectively illuminating said refueling receptacle, with said means disposed partially within said first nose fairing;
c. and, a second nose fairing floodlight assembly disposed on and in said upper surface of said nose section, wherein said assembly includes:
  (1) a second blade-like configurated fairing mounted substantially vertically upward on said upper surface of said nose section, forward of said cockpit windshield, adjacent to and starboard of said refueling receptacle, and parallel to said airflow lines along said upper surface of said nose section;
  (2) and, a third floodlight means for selectively illuminating said refueling receptacle, with said means disposed partially within said second nose fairing floodlight assembly;
whereby, when said first, second and third floodlight means for selectively illuminating said refueling receptacle are activated, said top and side surfaces of said receptacle are adequately illuminated without glare.

2. An aerial refueling receptacle floodlight illuminating system, as set forth in claim 1, wherein said first floodlight means of said spoiler floodlight assembly includes a plurality of floodlight illuminating subassemblies.

3. An aerial refueling receptacle floodlight illuminating system, as set forth in claim 2, wherein said plurality of floodlight illuminating subassemblies of said spoiler floodlight assembly comprises four such subassemblies.

4. An aerial refueling receptacle floodlight illuminating system, as set forth in claim 3; wherein said second and third floodlight means of, respectively, said first and second nose fairing floodlight assemblies, each includes one floodlight illuminating subassembly.

5. An aerial refueling receptacle floodlight illuminating system, as set forth in claim 4, wherein each of said plurality of floodlight illuminating subassemblies of said spoiler floodlight assembly includes a plurality of floodlight illuminating sources.

6. An aerial refueling receptacle floodlight illuminating system, as set forth in claim 5, wherein said floodlight illuminating subassembly of said first nose fairing floodlight means, and said floodlight illuminating subassembly of said second nose fairing floodlight means, each includes a plurality of floodlight illuminating sources.

* * * * *